Sept. 20, 1955 G. WALDES 2,718,047
SEPARABLE FASTENERS
Original Filed May 4, 1950

INVENTOR
GEORGE WALDES,
BY
ATTORNEY

United States Patent Office 2,718,047
Patented Sept. 20, 1955

2,718,047
SEPARABLE FASTENERS

George Waldes, Jackson Heights, N. Y., assignor to Waldes Kohinoor, Inc., Long Island City, N. Y., a corporation of New York Original application May 4, 1950, Serial No. 160,031, now Patent No. 2,607,715, dated August 19, 1952. Divided and this application January 21, 1952, Serial No. 267,429

4 Claims. (Cl. 28—78)

This invention relates to improvements in separable fasteners, and more particularly to an improved tape therefor of a character enabling a slide fastener to be effectively attached to an article of thermoplastic material, the present application being a division of my application Serial No. 160,031, filed May 4, 1950, now Patent No. 2,607,715, dated August 19, 1952.

Separable fasteners, such as slide fasteners and including also snap and hook-and-eye fasteners of the type wherein the fastener elements are mounted on tapes, are usually attached to the article with which they are to be incorporated by stitching the fastener tapes to the edges of the opening of the article to be closed by the fastener. However, in the case of articles made from thermoplastic material, for example, raincoats, pouches, purses, etc., attachment of the tapes by stitching is objectionable because the stitching is likely to tear through the thermoplastic material due to its low "stitch strength," resulting in insecure attachment and leaving unsightly openings.

Several attempts have been made to overcome this drawback, among which may be noted that of heat-sealing a tape, itself made of thermoplastic material similar to that from which the article is made, to said article along the edges of the opening, but such have not proved successful, due to the fact that a tape made from thermoplastic material is inherently stretchable, and the use of a stretchable tape in a separable fastener, particularly of the slider-controlled or "zipper" type, is not permissible, because of the requirement of uniform and exact pitch distance between fastener elements necessary to their proper inter-engagement and free slider movement.

To avoid the obvious drawback of stretchability of a fastener tape itself made of thermoplastic material while retaining the property of such a tape of being heat-sealable to an article of thermoplastic material, it has also been suggested to incorporate in the longitudinal rear or article-engaging zone of the tape threads or yarns of thermoplastic material, so that the rear attaching zone of the tape may be heat-sealed to the article made of thermoplastic material, while the front or fastener-element carrying zone of the tape is made wholly from threads or filaments of natural fibers, usually cotton which is non-stretchable. While such a tape has proved highly effective in practice, it is expensive, thus increasing the overall cost of the fastener, and it has been available heretofore only in limited supply from those concerns engaged in manufacturing fabrics made in part or whole of special plastics.

The present invention aims to and provides a different solution of the problem that has been outlined above, which gives the additional advantage of an all-natural-fiber (cotton) woven tape which is both substantially non-stretchable in longitudinal direction and is readily available as to supply, and the further advantage that it does not require special (usually electronic) heat-sealing to the article as with the prior tape incorporating thermoplastic threads or filaments in its article-attaching zone, but instead may be attached by any of the conventional means for applying heat and pressure, for example, a flat-iron.

Another object of the invention is the provision of a fastener tape which is particularly adapted for use with fasteners for so-called novelties, such as handbags, purses and the like, which are frequently made of very thin sheet plastic material, sometimes of thickness not exceeding .006", to which the proper attachment of fastener tape offers particular difficulties.

Yet another object of the invention is the provision of a fastener tape for attachment to an article made of thin plastic material which is so woven that it is inherently more porous in its longitudinal rear or article-attaching zone than in its opposite or front longitudinal zone mounting or carrying the fastener elements. Due to this greater porosity of the tape in its rear attaching zone, the thermoplastic material of the article, which, as is well known, becomes plastic (tacky) under heat, is enabled to penetrate the tape structure and, more particularly, to flow or be forced into the interstices between the interwoven threads or yarns making up the tape, thus to effect after the thermoplastic material has been consolidated a strong and effective bond between the thermoplastic material of the article and the woven fabric tape. This property of the tape to take up in its article-attaching portion a greater amount of thermoplastic material also gives the advantage that the juncture between article and tape is not readily discernible upon consolidation of the thermoplastic material as aforesaid, but, on the other hand, gives the appearance of the article and tape being substantially of continuous or one-piece construction.

The above and other objects and features of advantage of the improved fastener tape for separable fasteners according to the present invention will be seen from the following detailed description thereof, taken with the accompanying drawing illustrating the tape and one method of assembling and attaching the same to an article of thermoplastic material, in which Fig. 1 is a partial top plan view, on an enlarged scale, illustrating the improved fastener tape of the invention as applied to a slide fastener tape;

Figure 1:
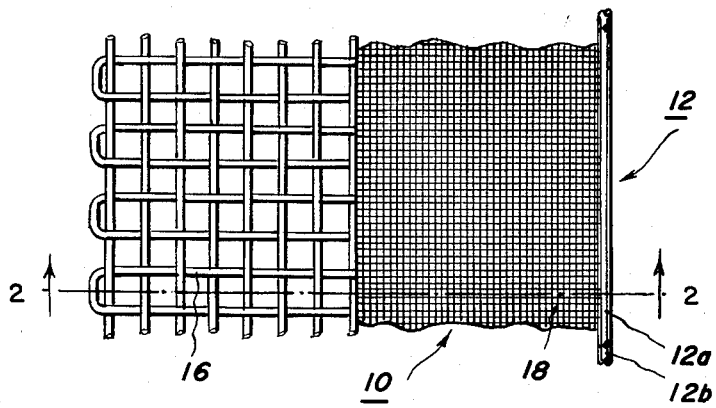
Figure 3:
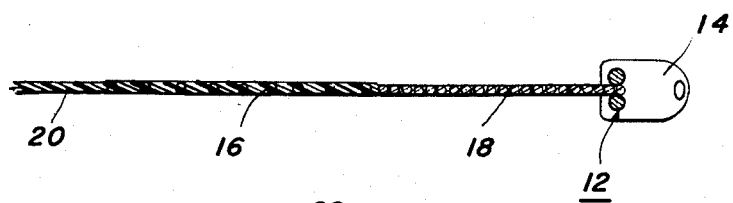
Fig. 3 is an enlarged section similar to Fig. 2 but illustrating the tape attached and bonded to the article.
Figure 4:
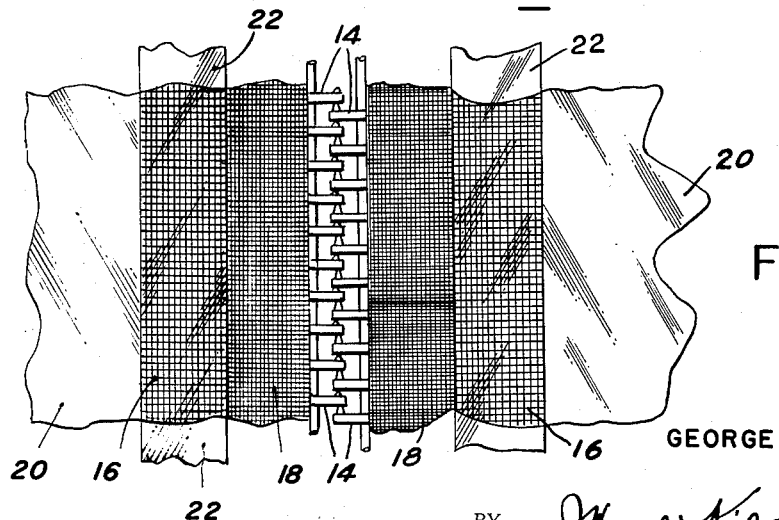
Fig. 4 is an enlarged plan view of a portion of a slide fastener stringer as finally attached to the article by the practice of a preferred method.

Referring to the drawing, reference character 10, Fig. 1, generally indicates the improved fastener tape of the present invention, illustratively shown in the form of the stringer tape of a slide fastener or "zipper" and being accordingly provided along one longitudinal edge with a bead 12, to which fastener elements 14 of the type generally indicated in Figs. 3 and 4 are clamped, for example, by running the tape through a conventional slide fastener assembling machine. The bead 12 illustrated is of two-part construction and consists of cords 12a, 12b stitched or otherwise secured against the upper and under faces of the tape to extend longitudinally along said one edge, but the bead may have other appropriate construction, or it may be removed entirely in case the illustrated tape (except for the bead 12) is intended for use with separable fasteners generally.

Although designed for use with separable (slide) fasteners to be attached to thermoplastic articles, the tape 10 is woven throughout from threads or yarns of natural fibers, usually cotton which is non-stretchable. Hence, the tape satisfies the requirement of a slide fastener tape in that, being non-stretchable, the fastener elements 14 carried thereby maintain uniform pitch distance. According to the invention, however, instead of the tape having the usual close-weave construction throughout, the longitudinal rear or article attaching zone 16 of the tape and which is of predetermined width of about half the total width of the tape has open-weave or mesh-like construction, with only the longitudinal front or fastener element carrying zone 18 of the tape being closely woven as usual. Consequent to the aforesaid open-weave construction of the longitudinal rear zone of the tape (which is the zone thereof that is conventionally attached to the article), said rear zone is extremely porous and hence it is capable of assimilating or taking up a substantial amount of the thermoplastic material of an article made from such material, upon said material being rendered plastic, in the large interstices between the interwoven warp and weft threads making up the same.

Figure 2:
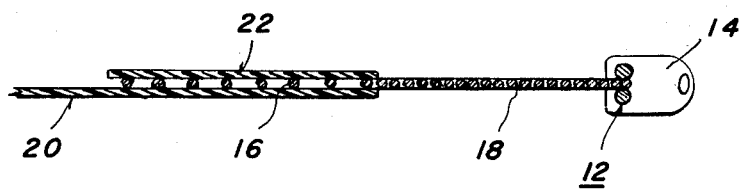
Fig. 2 is an enlarged sectional view illustrating the manner of assembling the tape on an article of thermoplastic material preparatory to heat-sealing the same thereto.

In attaching a tape 10 as aforesaid to an article made of thermoplastic material, the tape is applied to the edge 20 (Figs. 2 and 3) of the article opening so that its open-weave rear zone 16 overlies the thermoplastic material extending along and defining said edge, as indicated in Fig. 2. An additional thermoplastic strip 22 may be applied over the open-weave zone of the tape to extend along the length thereof, and in such case the tape is interleaved or sandwiched between the thermoplastic material of the article and of the applied strip 22.

Any conventional means for applying heat and pressure, for example, a flat-iron, is now pressed from above against the assembled article, tape and thermoplastic strip, which are of course suitably supported from below by a bed or table, whereupon the thermoplastic material of both the article and the strip is softened and becomes tacky, the applied pressure causing it to flow into the relatively large interstices of the tape, as indicated in Fig. 3. In effect, the applied thermoplastic strip 22 fuses into the thermoplastic material of the article with the result that, upon consolidation of the material, the tape is firmly bonded to the article along the edge of its opening.

For certain applications, the thermoplastic strip 22 may be omitted, in which case the thermoplastic material of the article effectively permeates the attaching zone of the tape 10. However, when used, the thermoplastic strip is preferably fashioned of the same thermoplastic material as that of the article, usually Vinylite.

It will thus be seen that the improved fastener tape of the invention is especially adapted for attachment to articles of thermoplastic material and, when attached as aforesaid is firmly and rigidly bonded thereto. It is a further feature of the invention that, upon a tape as aforesaid being bonded to the thermoplastic article as described, the overall appearance of the article is improved, as compared to thermoplastic articles employing the prior fastener tapes, since the appearance given is that of a comparatively continuous or one-piece structure, with the joint between article and tape being hardly, if at all, discernible. Moreover, a tape constructed according to the invention may be attached to an article made of thermoplastic material in a simple, convenient manner and without the need of expensive, complicated equipment. Thus, the invention achieves a quite simple solution of the relatively complex problem of attaching fastener tapes to articles of thermoplastic material, while at the same time giving the advantage incident to the use of a woven tape made throughout from non-stretchable natural fibers, as in insuring uniform exact pitch distance between the fastener elements, which latter is a strict requirement for separable fasteners of the slider controlled or so-called "zipper" type.

As many changes could be made in carrying out the above constructions without departing from the scope of the invention, it is intended that all matter contained in the above description or shown in the accompanying drawing shall be interpreted as illustrative and not in a limiting sense.

I claim:
1. In an article made from thermoplastic material, longitudinal edge portions of said thermoplastic material extending along an opening in said article, and separable fastener means for opening and closing said opening, said fastener means including a pair of fastener tapes each heat-sealed for a portion of its width to a corresponding width of an edge portion of the plastic material, said tape being woven throughout of natural fibers and being loosely woven throughout said width portion, the plastic material impregnating said loosely woven portion and bonding therewith, the remaining width portion of the tape being closely woven for strength and non-stretchability.

2. In an article made from thermoplastic material, longitudinal edge portions of said thermoplastic material extending along an opening in said article, and separable fastener means for opening and closing said opening, said fastener means including a pair of fastener tapes each heat-sealed for approximately half of its width to a corresponding width of an edge portion of the plastic material, said tape being woven throughout from threads of natural fibers and having open mesh construction throughout said half-width portion, the plastic material filling the interstices between the threads making up said width portion of open-work construction and bonding with said threads, the remaining half-width portion of the tapes having closed mesh construction throughout for strength and non-stretchability.

3. In a stringer for slide fasteners adapted for use on articles made of thermoplastic material, a tape woven throughout of threads or yarns of natural fibers and having substantially equal-width longitudinal attaching and fastener-carrying portions, said tape being adapted to be heat-sealed along its attaching portion to the thermoplastic material of said article and having slide fastener elements clamped to the edge of the fastener-carrying portion, said longitudinal attaching portion being loosely woven throughout whereby it is porous to and hence readily penetrable by the thermoplastic material of the article when said material is plastic, said fastener-element carrying portion being closely woven throughout for strength and non-stretchability.

4. In a stringer for slide fasteners adapted for use on articles made of thermoplastic material, a tape woven throughout of threads or yarns of natural fibers and having a longitudinal attaching width portion and a fastener-carrying width portion, said tape being adapted to be heat-sealed along its attaching width portion to the thermoplastic material of said article and having slide fastener elements clamped to the edge of the fastener-carrying width portion, said longitudinal attaching portion having open mesh construction throughout whereby it is porous to and hence readily penetrable by the thermoplastic material of the article when said material is plastic, said fastener-element carrying portion having closed mesh construction throughout for strength and non-stretchability.

References Cited in the file of this patent

UNITED STATES PATENTS

| | | |
|---|---|---|
| 742,468 | Merriam | Oct. 27, 1903 |
| 1,622,250 | Moore | Mar. 22, 1927 |
| 2,021,993 | Gutton | Nov. 26, 1935 |
| 2,079,831 | Bauer, Jr., et al. | May 11, 1937 |
| 2,205,570 | Lewis | June 25, 1940 |
| 2,263,172 | Heberlein | Nov. 18, 1941 |
| 2,395,869 | Hendley | Mar. 5, 1946 |
| 2,607,715 | Waldes | Aug. 19, 1952 |
| 2,652,705 | Weinberg | Sept. 22, 1953 |

FOREIGN PATENTS

| | | |
|---|---|---|
| 379,585 | Germany | Aug. 25, 1923 |
| 603,599 | Great Britain | June 18, 1948 |